Oct. 11, 1966   J. J. LYNOTT ETAL   3,277,588
INSTRUCTION TERMINAL

Filed Aug. 20, 1964   3 Sheets-Sheet 1

INVENTORS
JOHN J. LYNOTT
ROBERT C. TRESEDER
BY
*John H. Holcombe*
ATTORNEY

United States Patent Office 3,277,588
Patented Oct. 11, 1966

3,277,588
INSTRUCTION TERMINAL
John J. Lynott, Los Gatos, and Robert C. Treseder, San Jose, Calif., assignors to International Business Machines Corporation, New York, N.Y., a corporation of New York
Filed Aug. 20, 1964, Ser. No. 390,986
5 Claims. (Cl. 35—9)

The present invention relates to instructional devices and, more particularly, to a display terminal having means for student response.

Professional educators have understood for some time that a student's ability to learn any given subject matter depends not only upon his individual intelligence quotient, but also upon the order and method of presentation of the material. An especially important factor to be considered is that the method of presentation of the material must maintain the interest of the student, especially when a child is the student. Even in instances where the subject matter being taught is in itself interesting, the interest of the student cannot be maintained so long as the material is taught continually in the same manner, such as a continuing train of multiple choice questions. The student may successfully proceed through the instructional material, but his retention of the material will be exceedingly low due to the "dry" method of instruction.

Most of the prior instructional devices are subject to the pitfall that they repetitiously repeat the same method of instruction throughout the entire instructional material. The student soon tires of the method of instruction, and the instructional device soon loses its usefulness.

Thus, it is an object of the present invention to provide an instructional terminal which is capable of instructing in various ways so as to vary the method of presentation of the instructional material and thereby more effectively hold the interest of the student.

Professional educators have also understood for some time the difficulty in organizing the logical presentation of the instructional material. More often than not, the preferred logical order of presentation is arrived at by means of trial and error. Usually, the process involves arranging a logical order of presentation, and then testing the program by actually teaching students. The program is then evaluated and altered in accordance with the evaluation. The process is repeated until a fully acceptable program is obtained.

Reprogramming such as this is extremely difficult with most prior art machines. The prior art machines are generally serially programmed, such as sequentially presented film strip. Some machines have limited means for repeating material or skipping material, depending upon the progress of the student, but they do not allow rearrangement of the material, or of the mode of presentation of the material.

Thus, it is an object of the present invention to provide an instructional terminal allowing random presentation of the instructional material.

A further object of the present invention is to provide an instructional terminal allowing alterations to be randomly made in the method of presenting instructional material.

In accordance with the present invention, there is provided an instructional terminal including a random access slide storage and selection apparatus, an optical projection system, and a student response means including a position coordinate readout apparatus. This terminal thus provides randomly accessible optical displays and a student response means allowing multiple choice, tracing, true or false, etc., student responses. In addition to being randomly accessible, the system allows replacement of individual slides for use in the student program rather than requiring replacement of the entire film content.

Further, an additional slide storage unit and a flying spot scanner are provided for transmitting data from the terminal to a central processing control unit. Alternatively the flying spot scanner is replaced by a second optional projection system allowing simultaneous or closely timed "motion picture" projection of images. The instruction terminal may also include (1) a plurality of shutters for selectively blocking out all or portions of the displayed image, (2) a random access audio belt for the presentation of audio instruction material, and (3) an optical "pointer" for electrically projecting an illuminated spot onto the image display for highlighting certain items.

The instruction terminal in its ultimate form thus allows an almost infinite variety of modes of presentation of the instruction material under the direction of a central processing unit. This allows the mode of instruction to be varied at will so as to retain the interest of the student. Additionally, the terminal may be utilized as a research tool for the development of better logical orders of presentation and of different modes of presentation to increase the value of the instruction program.

The foregoing and other objects, features and advantages of the invention will be apparent from the following more particular description of preferred embodiments of the invention, as illustrated in the accompanying drawings, in which.

Figure 1:
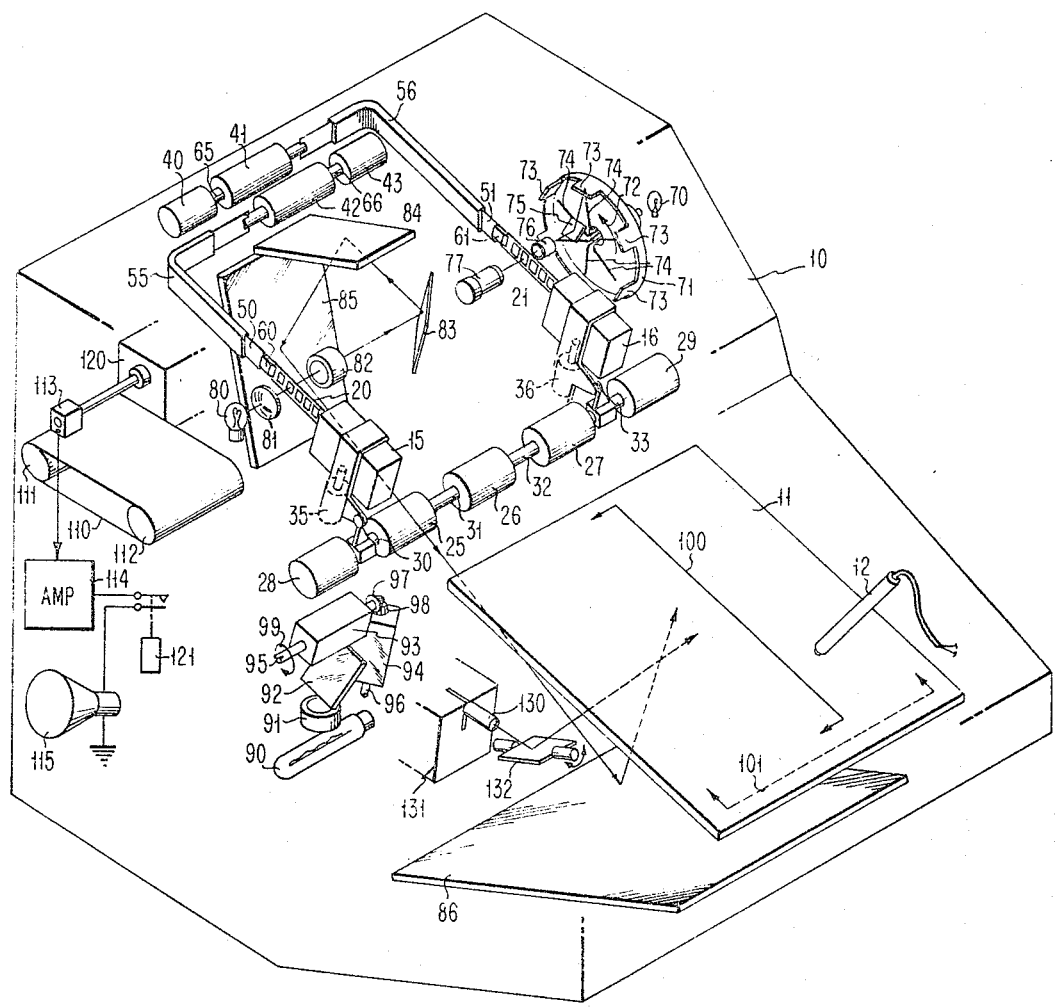
FIG. 1 is a perspective schematic overall view of an instructional terminal constructed in accordance with the invention.

FIG. 1 shows a preferred embodiment of an instructional terminal constructed in accordance with the present invention. The instructional terminal includes a cabinet 10 having a glass display screen thereon. The display screen 11 is supported by the cabinet with sufficient structural rigidity that the student may lean against the display screen or may place an object against the display screen with application of a force equivalent to a substantial portion of his weight. The glass screen must also be relatively thick so as to have sufficient structural rigidity to withstand the above.

Optical images are projected onto the back of screen 11, which is the primary means of presenting instructional material to the student. The student responds to the projected images by pressing a hand-held wand 12 against the surface of screen 11. A scanning mechanism detects the rectangular coordinates of the position of wand 12 and transmits the same to a central processing unit (not shown). The projected image may instruct the student to answer by placing the wand 12 adjacent his choice in a multiple choice question, to place the wand at what the student believes to be a proper geographic point on the image, to trace a particular design, etc.

Two plastic cells 15 and 16 are provided, each of which stores 64 microfilm slide strips 20 and 21 in two horizontal rows of 32 slides each. Each of the microfilm slides is individually held in a vertical plane by a groove in the inner surface of cells 15 and 16. As will be explained in more detail hereinafter, the cells 15 and 16 are positioned horizontally by means of a pneumatic binary adder mechanism. Henceforth, the term "pressurized" means a suitable pressure greater than atmospheric and "evacuated" means reduction of pressure to one atmosphere. The pneumatic adder mechanism includes individual adding pneumatic actuators 25, 26 and 27 and positioning pneumatic actuators 28 and 29. Each of the pneumatic actuators 25 and 26 are of any suitable type which includes two pistons and a dividing wall therebetween. One piston of actuator 25 is connected to shaft 30 and is movable within actuator 25 a distance equivalent to that between two adjacent microfilm slides, which is denoted as a binary distance of one unit. The second piston in actuator 25 is connected to shaft 31 and is movable by a binary distance of two. The piston in actuator 26 which is connected to shaft 31 is movable by a distance equivalent to a binary four. The other piston in actuator 26 is movable by a distance equivalent to eight binary units and is connected to shaft 32. Actuator 27 is of any suitable type that includes only a single piston which is connected to shaft 32 and is movable by a distance equivalent to 16 binary units. Shaft 33 is mounted solid to the casing of actuator 27. Thus, the actuators can move a total distance of 31 binary units to select any one of 32 slides.

A plurality of electrically operated valves (not shown) are provided for selectively supplying pressurized air from a pump (not shown) to selected portions of the pneumatic actuators, or evacuating air from the actuators. The valves are of any suitable type which may be operated by the central processing unit, for example, Skinner B3 DA9 100 valves available from Skinner Precision Industries.

A return spring and a brake mechanism hold cells 15 and 16 in previously selected horizontal positions until released. Assuming that cell 16 is to be moved to one of the 32 binary positions, the brake is released, appropriate portions of actuators 25, 26 and 27 are placed under pressure to attain the desired binary count, and positioning actuator 29 is placed under pressure, thereby moving cell 16 horizontally until stopped by actuators 25, 26 and 27 at the desired binary position. The brake is then actuated to hold cell 16 in the proper position, and positioning actuator 29 is evacuated. The brake on cell 15 may then be released and the adder operated so as to position cell 15. Pneumatic actuators 35 and 36 are provided so as to position cells 15 and 16 vertically so that either the upper or the lower row is in the proper position.

Two other sets of binary actuators, including actuators 40, 41, 42 and 43, are provided and are attached to straps 50 and 51. Guides 55 and 56 maintain the straps 50 and 51 in proper alignment, allowing them to be moved longitudinally in a manner similar to an automobile choke cable. Picker mechanisms 60 and 61 are mounted at the ends of straps 50 and 51. The picker mechanisms may be of any suitable type adapted to selectively engage or release microfilm slides 20 and 21, for example, that disclosed in U.S. Patent 3,055,522.

Each of the microfilm strips has five frames thereon spaced equally along the length of the strip. Pneumatic adders 40, 41, 42 and 43 are similar to pneumatic adders 25, 26 and 27, and are arranged to cause picker mechanisms 60 and 61 to engage microfilm strips 20 and 21, to then withdraw the selected strip from cell 15 or 16, and to longitudinally position the strip 20 or 21 to a desired binary longitudinal position so that a desired one of the five frames is properly aligned for projection or scanning.

The pistons in binary actuators 40 and 43 are allowed to move a distance equivalent to the spacing between two adjacent frames, or one binary unit. These pistons are connected respectively to shafts 65 and 66 and to pistons in binary actuators 41 and 42. The latter pistons are adapted to move a distance equivalent to two binary units, or two frames. The other pistons in actuators 41 and 42 are connected respectively to straps 50 and 51 and are allowed to move a distance equivalent to four binary units. This allows each set of pneumatic actuators to move the associated strap by an amount equivalent to seven frames. This allows the positioning of microfilm slides 20 and 21 to any of the five desired frames and allows an additional stroke of two binary units for pickers 60 and 61 to engage the strips in cells 15 and 16.

A flying spot scanner is provided, such as that described in copending application Serial No. 385,572, assigned to a common assignee with the present application. The flying spot scanner is described in detail in the copending application. Briefly, the flying spot scanner includes a light source 70, a support member 71 mounted for rotation about an axis in a direction of arrow 72 and having a plurality of mirrors 73 mounted about its periphery, a plurality of light pipes 74 mounted on the support member 71 for directing light from light source 70 toward mirrors 73, the mirrors 73 being arranged to deflect the light toward the axis essentially in a plane which is perpendicular to the axis, a stationary mirror 75 positioned to deflect the light from mirrors 73, a lens system 76, and a photocell 77. The flying spot scanner is arranged such that, as support member 71 rotates in the direction of arrow 72, the light directed by light pipes 74 from light source 70 and deflected by mirrors 73 scans horizontally across the selected frame of microfilm slide 21 in sequential, vertical steps, progressing from the top to the bottom of the frame. The beam of light is transmitted by clear portions of the frame, but is blocked by opaque portions which form the digital data on the selected frame. Photocell 77 receives the light and provides an electrical output whenever the light is being received, and provides no electrical output when the beam of light is intercepted by opaque portions of microfilm slide 21.

An optical projection system is provided which is similar to that of any of the well known 35 millimeter slide projectors. The projection system includes a light source 80, a collimating lens 81, a focusing lens system 82, and a series of mirrors 83, 84, 85 and 86. Lens 81 collimates light from point source 80 to produce a uniform illumination of the selected frame on microfilm slide 20. Lens system 82 projects and focuses the light from the illuminated frame toward mirror 83, where the light is reflected first by mirror 83, then by mirrors 84, 85 and 86 onto glass screen 11. Lens system 82 is adjusted to provide a sharp image of the selected frame on glass screen 11.

The student responds to the projected image by placing wand 12 against screen 11 at a selected point thereon. The rectangular coordinates of that point are detected by means of a scanning apparatus. The wand 12 and the scanning apparatus are described in detail in copending application Serial No. 384,948, assigned to a common assignee with the present application. As discussed in that application, the wand 12 has a photosensitive element therein, which is activated when the wand is pressed against glass sheet 11, and detects any light impinging on screen 11 that is substantially brighter than that of the projected image.

The scanning apparatus includes a lamp 90, which produces a line of light, and a focusing lens 91 situated adjacent lamp 20 which directs the line of light from lamp 90 to a beam splitter 92. Beam splitter 92 is a sheet of glass having a mirrorized reflective surface which is arranged to reflect one-half of the light impinging thereon and allow the remaining one-half of the light to penetrate the reflective surface. Two mirrors 93 and 94 are provided, each having four identical reflective surfaces at right angles to one another. Mirror 93 is fixedly mounted on shaft 95, and mirror 94 is fixedly mounted on shaft 96. Shafts 95 and 96 are mounted for rotation at right angles to one another. A gear 97 is fixedly mounted on shaft 95, and a similar gear 98 is fixedly mounted on shaft 96 and is arranged to engage gear 97. A motor (not shown) is arranged to rotate shaft 95 in the direction of arrow 99. The meshing of gears 97 and 98 causes the simultaneous rotation of shaft 96.

Mirror 93 is mounted on shaft 95 such that its reflective faces are displaced angularly approximately 45 degrees from the reflective faces of mirror 94. Thus, as the portion of the line of light from lamp 90 reflected by beam splitter 92 is reflected by mirror 94 onto mirror 86 and glass sheet 11, thereby creating vertical line of light 100, mirror 93 directs the portion of light penetrating beam splitter 92 away from mirror 86. A shield (not shown) allows only light reflected by mirror 86 to reach glass screen 11. As the motor rotates shafts 95 and 96, vertical line of light 100 is swept from right to left across the screen 11. After line of light 100 is swept off of screen 11, mirror 93 is in position to begin to sweep horizontal line of light 101 across screen 11 from bottom to top.

As described in the copending application, lines of light 100 and 101 are alternately swept across screen 11 in synchronism with a counter. Upon the light-sensitive device of wand 12 detecting either of the lines of light, the output of the light-sensitive device is used to gate the instantaneous count of the counter, thereby providing the rectangular coordinates of the position of wand 12. Electrical signals representative of the rectangular coordinates are then transmitted to a central processing unit (not shown).

The operation of the instructional terminal as thus far described is as follows. The central processing unit provides a series of electrical signals which actuate selected pneumatic valves (not shown). The central processing unit also transmits an electrical signal on a proper line to operate a solenoid and release the brake holding cell 16 and shaft 33. The pneumatic valves, connected to all of the pneumatic actuators by means of hoses, operate selected ones of pneumatic actuators 25, 26, 27 and 36 to position a desired one of the 64 slides contained in cell 16 opposite picker 61. The brake is then actuated to hold cell 16 in the selected position, and a return spring positions shaft 33 of the pneumatic adder in the "normal" position where it is locked in position by means of a brake.

The pneumatic valves then operate pneumatic actuators 40 and 41 so that they are fully extended, pushing picker 61 into cell 16 where the picker engages the selected microfilm strip 21. In response to signals from the central processing unit, pneumatic actuators 40 and 41 retract a specified number of binary units to align a desired frame on microfilm strip 21 with the optical path of the flying spot scanner.

At this time, the central processing unit transmits a second set of electrical signals releasing shaft 30 and causing the pneumatic valves to operate pneumatic actuators 25, 26, 27 and 35 to position a selected microfilm strip in cell 15 opposite picker 60. Then, pneumatic actuators 42 and 43 are fully extended to drive picker 60 into cell 15 to engage the selected microfilm strip 20. Pneumatic actuators 42 and 43 then withdraw picker 60 so as to position a selected frame in microfilm slide 20 in the optical path of the projection system.

The output of the flying spot scanner is connected to the central processing unit. As support member 71 is rotated, the projected beam of light scans in consecutive horizontal sweeps across the selected frame of film strip 21. The clear data appearing on the primarily opaque frame of film strip 21 allows the light to reach photocell 77. Light impinging on the photocell causes the photocell to produce an electrical output representative of the data recorded on the selected frame. This electrical output is then transmitted directly to the central processing unit. The speed of the flying spot scanner is such that the selected frame is scanned many times during the time period in which the student examines the display presented on screen 11 and presents his answer. The central processing unit is designed to accept and diagnose the repetitious information obtained from the flying spot scanner and coordinate this data with the data received from the student response apparatus.

At the same time, the projection apparatus comprising light source 80, lenses 81 and 82, and mirrors 83 through 86 project the image contained in the selected frame of microfilm slide 20 onto screen 11.

At this time, the central processing unit stands by awaiting the response of the student to the projected image. The scanning apparatus continually scans horizontal and vertical lines of light 101 and 100 alternately across screen 11. The scanner operates at a sufficient speed so that the lines of light are swept at a relatively high rate of speed and do not disturb the student's concentration on the projected image. The photosensitive device in wand 12 remains inoperative so long as it is not pressed against screen 11.

As the student responds to the projected image by placing wand 12 against screen 11 at a point he selects, the photosensitive device is activated and senses lines of light 100 and 101 as they sweep across the tip of wand 12. Upon detecting each of the lines of light, the output of the light-sensitive device gates the instantaneous count of the counter associated with the scanning apparatus. The count of the counter represents one of the rectangular coordinates of the position of the tip of wand 12. This data is immediately transmitted to the central processing unit which compares the data with that transmitted by the flying spot scanner. The correlation of the two sets of data causes the central processing unit to respond to the data presented by the flying spot scanner by transmitting appropriate electrical signals to the instructional terminal to select new frames for display on screen 11 and to be read by the flying spot scanner.

Assuming that only new frames are to be selected from the identical filmstrips 20 and 21, the central processing unit may signal the pneumatic valves to operate pneumatic actuators 40, 41, 42 and 43 to a new set of binary positions. However, if new microfilm strips are to be selected, the central processing unit transmits signals to the instructional terminal, causing the pneumatic valves to fully extend pneumatic actuators 40, 41, 42 and 43 to insert microfilm slides 20 and 21 fully into their associated cells, whereupon pickers 60 and 61 disengage the slides. The pneumatic valves then cause the pneumatic actuators 40, 41, 42 and 43 to withdraw pickers 60 and 61 from the cells. Simultaneously, signals from the central processing unit release the brakes on cells 15 and 16 and cause pneumatic actuators 35 and 36 to return to a "normal" position.

Then, the entire system operates exactly as before to select different microfilm slides from cells 15 and 16, project an image onto screen 11, scan data from a selected frame on slide 21, and scan screen 11 to determine the rectangular coordinates of the student's response.

It is easily seen that, utilizing the random access capabilities of the instruction terminal, the instructional material may be rearranged at any time by either changing the data on a frame of filmstrip 21, or by changing the positions of the frames or slides within cells 15 or 16. Additional apparatus is illustrated in FIG. 1 which allows the instructional material to be presented in various ways so as to more effectively hold the interest of the student.

An audio system is provided including a magnetizable belt 110, a driving roller 111, an idle roller 112, a magnetic transducer 113, an audio amplifier 114, and a speaker 115. All of these units, including apparatus allowing magnetic tape 110 to be replaced and the motor driving spindle 111, are identical to those used in the IBM Executary dictating machine now commercially available. The difference between the IBM Executary and the apparatus used here is the positioning apparatus 120. Here, the horizontal positioning mechanism described in U.S. Patent 2,994,856 and associated circuitary is used to position transducer 113 at a selected recorded track on magnetic belt 110. Upon selecting a desired track, the positioning mechanism 120 maintains transducer 113 on that track until such time as the mechanism is operated to another position at another track by the central processing unit. Additionally, relay switch 121 is provided, and is normally open, preventing the output of amplifier 114 from operating speaker 115. An electrical signal from the central processing unit on an appropriate line operates relay switch 121 to connect amplifier 114 to speaker 115. At this time, the output read by transducer 113 is reproduced by speaker 115.

Thus, under the control of the central processing unit, appropriate audio instructional material may be selected from belt 110 by positioning mechanism 120 and transducer 113 to supplement, or perhaps replace, the optical instructional material on screen 11.

Apparatus is provided for pointing out or highlighting a specific portion of the display on screen 11. Included is a light source and focusing lens 130, the vertical positioning means 131, and a horizontal positioning means 132. The light source is turned on or off by the central processing unit as desired. The light source and focusing lens 130 are mounted on vertical positioning means 131. The positioning means may be any suitable apparatus responsive to signals from the central processing unit for rotating light source and lens 130 about an axis to a selected radius from that axis and holding the light source and lens in the selected position. Horizontal positioning means 132 is a mirror which is driven by any suitable means responsive to signals from the central processing unit which rotates the mirror to a desired radial position and holds the mirror in that position.

Essentially, the flying spot scanner and microfilm strips 21 serve as the programming device for the central processing unit. Data on the selected frame of microfilm strip 21 is read by the flying spot scanner and presents a code instructing the central processing unit to perform in certain ways. The central processing unit responds to this data and to the student's response by providing appropriate electrical signals to the various components of the instruction terminal.

In the event that the central processing unit contains its own program materials, the flying spot scanner need not be made a part of the instruction terminal. This is illustrated with reference to FIG. 2.

Figure 2:
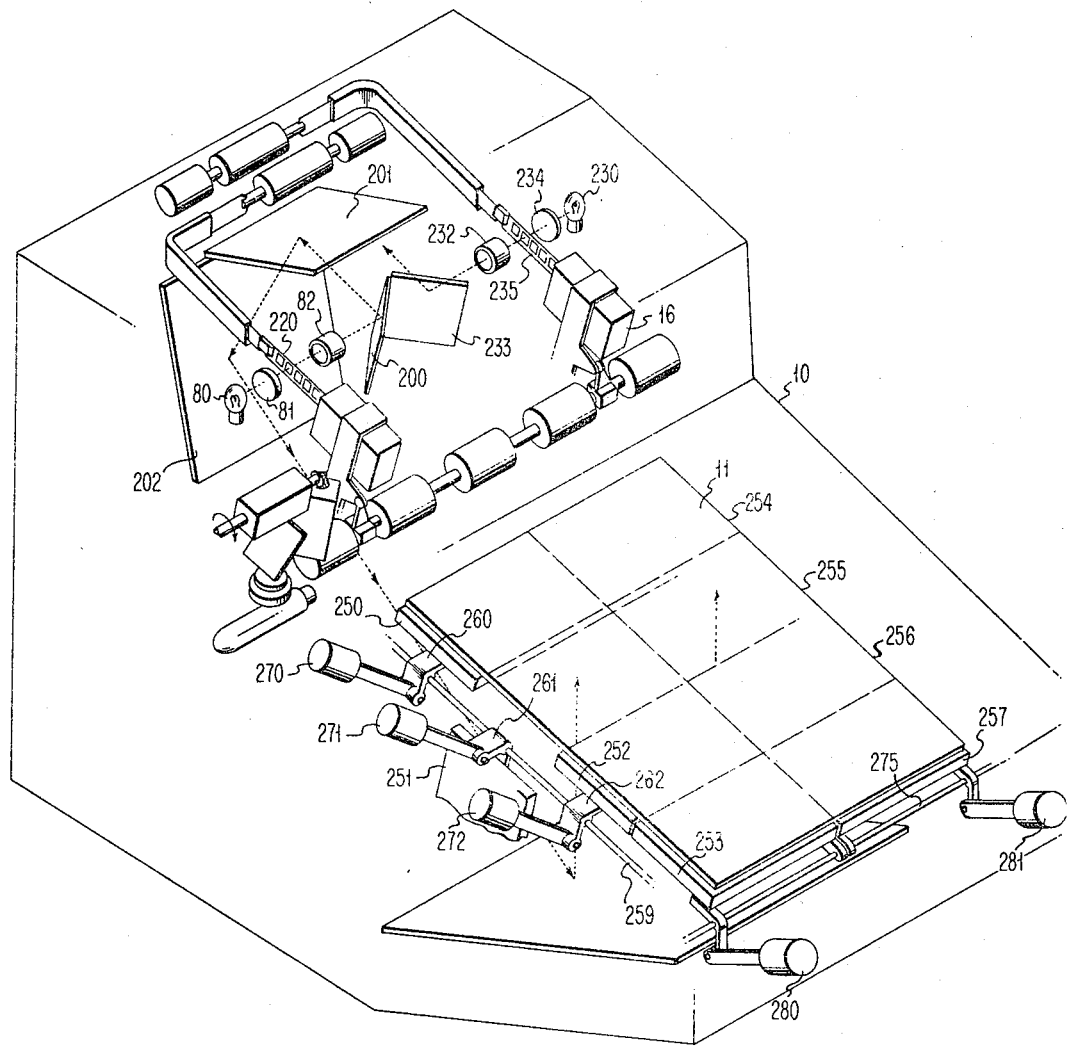
FIG. 2 is a perspective schematic overall view of an alternative embodiment of the instruction terminal constructed in accordance with the invention.

In FIG. 2, all of the essential elements of FIG. 1 are shown with the exception of the flying spot scanner. The slide storage and selection mechanism is identical to that shown in FIG. 1, as is the student response coordinate readout mechanism.

The left-hand projection system is similar to that shown in FIG. 1, and includes a light source 80, a collimating lens 81, a focusing lens system 82, and mirrors 200, 201, 202 and 86. The microfilm slides 220 are slightly different from slides 20 of FIG. 1 in that the individual frames on slide 220 are one-half the width of those on slide 20. All other aspects of the microfilm slides, including the center-to-center spacing of the frames, are identical to that of microfilm slides 20. Also, the mirrors are arranged to deflect the image presented by the selected frame on slide 220 onto only the left one-half of display screen 11. The flying spot scanner of FIG. 1 is replaced in FIG. 2 by a right-hand optical system which is identical to the left-hand optical system of that figure. The right-hand optical system includes a light source 230, a collimating lens 231, a focusing lens system 232, and mirrors 233, 201, 202 and 86. Microfilm slides 235, stored in cell 16, are identical in characteristics to microfilm slides 220. Thus, the right-hand optical system projects the image from a selected frame on microfilm slide 235 onto only the right one-half of display screen 11.

The system shown in FIG. 2 allows the central processing unit to alter either half of the projected total image on screen 11 without altering the other one-half. For example, it is possible to project on the right half of display screen 11 a first question pertaining to the display on the left half of display screen 11, then an answer to the question, a second question, a second answer, etc., all on the right half of display screen 11.

A plurality of shutters 250–257 are provided which selectively block portions of the projected images from reaching screen 11. Shutters 250, 251 and 252 are mounted on shaft 259 by means of arms 260, 261 and 262. A series of sleeves (not shown) are placed on shaft 259 to prevent arms 260, 261 or 262 from sliding longitudinally along shaft 259. Pneumatic actuators 270, 271 or 272 are selectively operated by the central processing unit to rotate the associated shutter about shaft 259 into position against screen 11. Upon release of air pressure in any of the pneumatic actuators 270, 271 or 272, the weight of the associated shutter causes the shutter to rotate about shaft 259 away from screen 11. Shutters 254, 255 and 256 are similarly mounted on a shaft at the right-hand side of screen 11 and are similarly selectively rotated into position by pneumatic actuators. Shutters 253 and 257 are mounted for rotation on shaft 275 and are similarly selectively rotated into position against screen 11 by pneumatic actuators 280 and 281.

Thus, the central processing unit may selectively actuate any of the shutters to sequentially present questions and answers provided by the projected image, or selectively present to the student portions of the projected image as desired.

The instruction terminal of FIG. 2, therefore, is capable of closing all the shutters on one-half of screen 11 and selecting a new frame or microfilm slide for presenting a new image to that half of screen 11 while the student is concentrating on the image on the other one-half of the screen. Additionally, the instruction terminal of FIG. 2 is capable, then, of selectively opening desired ones of the shutters to expose only selected portions of the new image to the student. This substantially enhances the capability of random presentation of the instructional material.

As an alternative embodiment of the instruction terminal of FIG. 2, light sources 80 and 230 may be provided with shutter systems, frames contained in slides 220 and 235 may be full size, and mirrors 200, 233, 201, 202 and 86 may be designed to project the entire full-sized image from each frame onto the entire area of screen 11. This would allow, depending upon the operation of the shutters by the central processing unit, the superpositioning of two images simultaneously on screen 11, or switching between the two optical systems without appreciable delay between the presentation of images. This latter option would allow a motion picture type of presentation of the instructional material.

Figure 3:
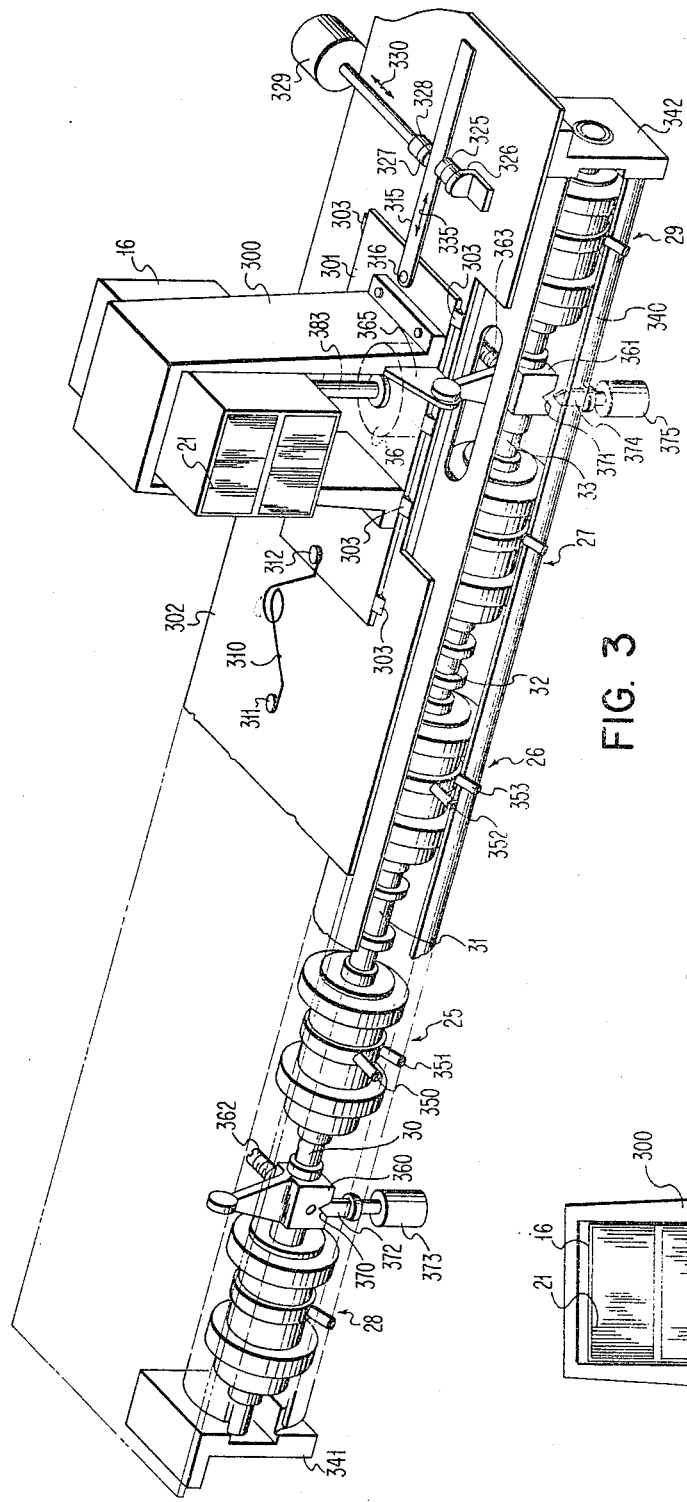
FIG. 3 is a perspective view of the random access slide storage and selection apparatus of FIGS. 1 and 2.
Figure 4:
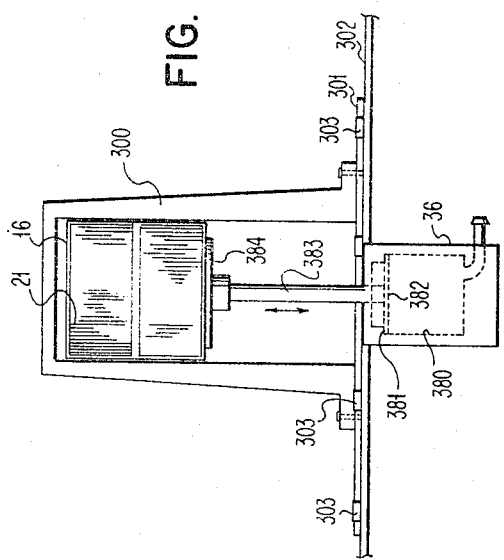
FIG. 4 is a rear view of the microfilm slide cell, frame, and vertical actuator of FIG. 3.

Referring to FIGS. 3 and 4, the slide selection mechanism of FIGS. 1 and 2 will be explained in greater detail. For the sake of simplifying the explanation, only so much of the positioning apparatus that is used for positioning cell 16 is shown.

Cell 16 is mounted within frame member 300 such that the cell is free to move vertically up or down, but is unable to move horizontally in any direction with respect to frame 300. Frame member 300 is fixedly mounted on plate 301. Plate 301 rests on the surface of fixedly positioned frame member 302. Frame member 302 is fixedly attached to the cabinet of the instruction terminal. Guides 303, which are permanently attached to frame member 302, allow plate 301 to slide freely along the guides to the left and right, but prevent motion of the plate to the front or rear.

Compression spring 310 is attached at one end by pin 311 to frame member 302 and at the other end by pin 312 to slide plate 301. Spring 310 is therefore constantly tending to force sliding plate 301 to the right. An arm 315 is attached to sliding plate 301 by pin 316, but is free to swivel about the pin. A brake pad 325, made of any suitable frictional material, is fixedly mounted to support 326. A second similar brake pad 327 is fixedly mounted on arm 328 of electrical solenoid 329. Solenoid 329 is fixedly mounted on frame 302 and is connected electrically to the central processing unit. Solenoid 329 is operable by the central processing unit to selectively move arm 328 in either direction shown by arrows 330. Arm 315 is placed between brake shoes 325 and 327 so that energization of solenoid 329 to force arm 328 and brake shoe 327 toward brake shoe 325 compresses arm 315 between the brake shoes. The frictional force so obtained prevents movement of arm 315 and sliding plate 301. If solenoid 329 is operated to withdraw arm 328 and brake shoe 327 away from brake shoe 325, arm 315 is released and sliding plate 301 is then free to move in either direction as shown by arrows 335.

A pneumatic binary adder mechanism as described with respect to FIG. 1, includes individual adding pneumatic actuators 25, 26 and 27 and positioning pneumatic actuators 28 and 29. These pneumatic actuators are of any suitable type of pneumatic piston actuator. It is to be understood that any suitable positioning apparatus may be used and that the particular embodiment shown employing pneumatic actuators is merely an example which has been found to work well. The pneumatic actuators are held in axial alignment by a cylindrical carrier 340 which is attached at one end to support 341 and at the other to support 342. Supports 341 and 342 are fixedly attached to frame member 302 as shown. As thus positioned, the pneumatic actuators are free to move longitudinally within cylindrical carrier 340.

As discussed above, each of the pneumatic actuators 25 and 26 includes two pistons and a dividing wall therebetween, whereas the other pneumatic actuators include only a single piston. Orifice 350 of actuator 25 opens into the cylinder formed by the dividing wall and the piston connected to shaft 30. Orifice 351 opens into the cylinder formed between the dividing wall of actuator 25 and the piston connected to shaft 31. Likewise, orifice 352 of actuator 26 opens into the cylinder formed between the dividing wall and the piston connected to shaft 31, while orifice 353 opens into the cylinder formed between the dividing wall and the piston connected to shaft 32. In the case of all other actuators, the orifice provided opens into the cylinder formed by the sole piston and the walls of the actuator. As discussed above, actuators 25, 26 and 27 form a binary adder in which the piston of actuator 25 connected to shaft 30 is movable within actuator 25 a distance of one binary unit. The piston in actuator 25 connected to shaft 31 is movable within the actuator a binary distance of two units. The piston in actuator 26 connected to shaft 31 is movable a distance of four units, and the piston connected to shaft 32 is movable a distance of eight units. The single piston within actuator 27 is connected to shaft 32 and is movable a distance of 16 units, and the casing of actuator 27 is fixedly mounted to shaft 33. Thus, the actuators 25, 26 and 27 can move a total distance of 31 binary units.

Positioning pneumatic actuators 28 and 29 each have a single piston and are capable of a total throw equivalent to at least 32 units. The piston of actuator 28 is connected to shaft 30, and the casing is connected to support 341. The piston of pneumatic actuator 29 is connected to shaft 33, and the casing is connected to support 342.

Arms 360 and 361 are loosely mounted on shafts 30 and 33, respectively. Upon being properly adjusted, screws 362 and 363 are tightened against shafts 30 and 33 to fixedly position arms 360 and 361 thereon. Arm 361 is arranged to contact an arm 365 which is fixedly attached to frame member 300. Thus, if braking arm 315 is released by solenoid 329, the movement of shaft 33 and arm 361 will correspondingly move arm 365, frame 300, frame 301 and cell 16.

Notches 370 and 371 are provided at the bottom of arms 360 and 361, respectively. A detent 372 is arranged to fit into notch 370 when arm 360 is positioned as far as possible towards support member 341 and when solenoid 373 is operated by the central processing unit to force the detent upward. Solenoid 373 is fixedly attached to guide member 340 and prevents axial motion of arm 360 or shaft 30 when detent 372 is in position in notch 370. Likewise, a detent 374 is designed to fit into notch 371 when actuated upward by a solenoid 375 and when arm 361 is in its rightmost position. Solenoid 375 is fixedly attached to guide 340 and holds arm 360 against axial movement when detent 374 is in position in notch 371.

The apparatus described thus far with respects to FIGS. 3 and 4 position cell 16 horizontally, and a similar apparatus positions cell 15 horizontally. Since cell 16 has two rows of microfilm slides, it is necessary to move cell 16 vertically to one of two positions so that one of the two rows of microfilm slides is aligned with the picker mechanism.

To accomplish this vertical movement, a pneumatic actuator 36 is fixedly attached to sliding plate 301 so that it moves horizontally in conjunction with cell 16. The pnuematic actuator 36 is similar in design to all of the other pneumatic actuators and is shown in detail to present an example of a suitable kind of actuator. A cylinder 380 is formed in the interior of actuator 36, having a shoulder 381. A piston 382, made of any suitable material forming a tight seal with the walls of cylinder 380, is placed within cylinder 380 and is attached to a shaft 383. The stroke of the piston 382 is measured by the distance between the bottom of cylinder 380 and shoulder 381. A support member 384 is attached to the upper end of shaft 383 and supports cell 16. Thus, upon application of air pressure to actuator 36, piston 382, shaft 383 and support member 384 are forced upward, raising cell 16 so that the lower row of microfilm slides are aligned with the picker mechanism. Conversely, upon evacuation of actuator 36, the weight of the parts involved forces piston 382 to the bottom of cylinder 380. Thus, shaft 383 and support member 384 lower cell 16 so that the upper row of microfilm slides is aligned with the picker mechanism.

The operation of the slide selection apparatus shown in FIGS. 3 and 4 is as follows. Immediately after a cell has been positioned, positioning actuators 28 and 29 are evacuated and adding actuators 25, 26 and 27 are placed under pressure to force arms 360 and 361 to the furthest extent toward support members 341 and 342, respectively.

Assuming that cell 16 is to be positioned, the central processing unit operates solenoid 373 to drive detent 372 upward into notch 370. This holds arm 360 and shaft 30 in a fixed axial position which serves as a base position for the operation of the adding actuators 25, 26 and 27.

After the operation of solenoid 373, the central processing unit accomplishes the following steps almost simultaneously. Desired sections of adding actuators 25, 26 and 27 are evacuated, and pressure is maintained in the remaining sections; solenoid 329 is released, freeing arm 315 from brake shoes 325 and 327 to allow spring 310 to force sliding plate 301 to the right; and pressure is applied to positioning pneumatic actuator 29, tending to force shaft 33 and arm 361 to the left. Thus, spring 310 forces arm 365 toward the right into contact with arm 361, which is being forced to the left by actuator 29. The pressure of the air forced into actuator 29 is the same as that of the air being maintained in selected sections of adding actuators 25, 26 and 27. The pressure is sufficiently high to create a force on the piston of actuator 29 greater than that created by spring 310. Thus, positioning pneumatic actuator 29 forces arms 361 and 365, frame member 300, sliding plate 301, arm 315 and cell 16 to the left, overcoming the force of spring 310 and telescoping the exhausted sections of adding actuators 25, 26 and 27. Upon the telescoping of the exhausted sections of the adding actuators, the combined force of spring 310 and of the air pressure in the pressurized sections of the adding actuators halts further extension of shaft 33 from positioning actuator 29. This stops the cell 16 at the desired point, and the system is held in equilibrium at this point as solenoid 329 is operated. The operation of solenoid 329 compresses arm 315 between brake shoes 327 and 325, locking cell 16 in the desired position.

With cell 16 thus secured in the selected horizontal position, the central processing unit operates pneumatic valves to evacuate positioning actuator 29 and to pressurize all sections of the adding actuators to thereby position arm 361 as far as possible toward support member 342. Then, the central processing unit operates solenoid 373 to withdraw detent 372 from notch 370. The horizontal positioning mechanism is thus returned to its normal state, and is ready to next be operated to similarly position cell 15 or to move cell 16 to a new horizontal position.

With cell 16 in the proper horizontal position, the central processing unit may evacuate or pressurize pneumatic actuator 36, if needed, to properly position cell 16 vertically. Assuming that cell 16 is in the position shown in FIGS. 3 and 4 and that it is desired to lower cell 16 so that its upper row of slides is properly positioned with respect to the picker mechanism, the central processing unit operates a pneumatic valve to evacuate pneumatic actuator 36. This allows piston 382 to drop to the bottom of cylindrical opening 380, which correspondingly lowers shaft 383, support member 384 and cell 16, thereby properly positioning cell 16. Correspondingly, cell 16 may be raised by merely pressurizing pneumatic actuator 36 to raise piston 382 to touch shoulder 381. This positions the lower row of microfilm slides in cell 16 opposite the picker mechanism.

From the above description, it can be seen that the present invention provides an instruction terminal allowing random presentation and ease of replacement of the instructional material, a plurality of randomly and simultaneously useable means of presenting instructional material, in combination with a student response means capable of many uses.

While the invention has been particularly shown and described with reference to preferred embodiments thereof, it will be understood by those skilled in the art that various changes in form and details may be made therein without departing from the spirit and scope of the invention.

What is claimed is:

1. An instruction terminal for providing random access display and detecting student responses, comprising:
   a plurality of storage media having display images thereon;
   means for storing said plurality of storage media;
   a display screen;
   an optical system having an optical path for projecting a display image from one of said storage media onto said display screen;
   a random access selector and picker mechanism for picking a selected storage medium from said storing means and placing said selected storage medium in said optical path for projection;
   a student response wand having a photodetector therein, said wand being manually positionable, whereby a student may position said wand, and thereby said photodetector, at a selected position on said display screen;
   means for alternately scanning lines of light vertically and horizontally across said display screen, illuminating said photodetector upon intersecting with said wand when said wand is manually positioned on said display screen; and
   means for detecting the position of either of said lines of light on said screen when said photodetector is illuminated.

2. An instructional display system operable by a central processing unit and allowing student response, comprising:
   a plurality of microfilm slides having human-readable display images thereon;
   two cells, each holding a portion of said plurality of slides;
   a display screen;
   two optical systems, each having an optical path for projecting an image of a slide onto said display screen;
   a selector and picker mechanism for picking a selected slide from each of said cells, the mechanism placing a selected slide from the first of said cells in one of said optical paths for projection, and placing a selected slide from the other of said cells in the other one of said optical paths for projection;
   means for alternately scanning lines of light vertically and horizontally across said display screen;
   a student response wand having a photodetector in one end thereof, said wand being manually positionable, whereby a student may position said wand, and thereby said photodetector, at a selected position on said display screen, whereby said photodetector may be illuminated by either of said lines of light; and
   means for detecting the position of either of said lines of light on said display screen when said photodetector is illuminated.

3. An instruction display terminal producing a random access visual display, allowing student response, and providing a random access source of digital data, comprising:
   a plurality of microfilm slides, a first portion of said plurality of slides having human-readable display images thereon, and the other portion of said plurality of slides having digital data thereon;
   two cells, the first storing said first portion of said plurality of slides, and the second storing said other portion of said plurality of slides;
   a display screen;
   an optical system having an optical path for projecting an image of a slide onto said display screen;
   a scanning apparatus for reading digital data contained in a microfilm slide;
   a selector picker mechanism for picking a selected slide from either of said cells, the mechanism placing a selected slide from the first of said cells in said optical path for projection, and placing a selected slide from the second of said cells in position to be scanned by said scanning apparatus;
   a student response wand having a photodetector in one end thereof, said wand being manually positionable, whereby a student may position said wand, and thereby said photocell, at a selected position on said display screen;
   means for alternately scanning lines of light vertically and horizontally across said display screen, whereby said positioned photodetector is illuminated; and
   means for detecting the position of either of said lines of light on said display screen when said photodetector is so illuminated.

4. A display terminal, comprising:
   a display screen;
   a plurality of storage media having display images thereon;
   means for storing said plurality of storage media;
   an optical system having an optical path for projecting a display image from one of said storage media onto said display screen;
   random access means for picking a selected storage medium from said storage means and placing said selected storage medium in said optical path for projection; and
   means for detecting a point on said display screen selected by a person viewing said image display, comprising:
      a wand having a photodetector therein, said wand being manually positionable, whereby a person may position said wand, and thereby said photodetector, at a selected position on said display screen,
      means for alternately scanning lines of light vertically and horizontally across said display screen, illuminating said photodetector upon intersecting with said wand when said wand is manually positioned on said display screen; and means for detecting the position of either of said lines of light on said screen when said photodetector is illuminated.

5. A display terminal, comprising:

a display screen;

a plurality of microfilm slides having display images thereon;

two storage means, each storing a portion of said plurality of slides;

two optical systems, each having an optical path for projecting an image of a slide onto said display screen;

two picker mechanisms for picking a properly positioned slide from either of said storage means, the first picker mechanism placing a selected slide from the first of said storage means in one of said optical paths for projection, and the other picker mechanism placing a selected slide from the other of said storage means in the other one of said optical paths for projection;

a pneumatic selector mechanism for positioning, selectively, either one of said storage means so that a selected slide in said selected one of said storage means is properly positioned with respect to the associated one of said picker mechanisms, whereby said picker mechanism may pick said selected slide; and means for detecting a point on said display screen selected by a person viewing said image display.

References Cited by the Examiner
UNITED STATES PATENTS 3,121,959  2/1964  Uttal et al. _____ 35—9
3,141,243  7/1964  Chapman et al. _____ 35—9

EUGENE R. CAPOZIO, *Primary Examiner.*

R. E. KLEIN, *Assistant Examiner.*